(12) United States Patent
Patel et al.

(10) Patent No.: US 11,040,583 B2
(45) Date of Patent: *Jun. 22, 2021

(54) SYSTEMS AND METHODS FOR CONTROLLING VEHICLE TPMS SENSOR LOCALIZATION

(71) Applicant: Ford Global Technologies, LLC, Dearborn, MI (US)

(72) Inventors: Dilip B. Patel, Novi, MI (US); Ali Hassani, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/786,104

(22) Filed: Feb. 10, 2020

(65) Prior Publication Data

US 2020/0171891 A1 Jun. 4, 2020

Related U.S. Application Data

(62) Division of application No. 15/885,250, filed on Jan. 31, 2018, now Pat. No. 10,596,865.

(51) Int. Cl.
*B60C 9/04* (2006.01)
*B60C 23/04* (2006.01)

(52) U.S. Cl.
CPC .............................. *B60C 23/0416* (2013.01)

(58) Field of Classification Search
CPC ................................................ B60C 23/0416
See application file for complete search history.

(56) References Cited

U.S. PATENT DOCUMENTS

| | | | | |
|---|---|---|---|---|
| 10,596,865 | B2* | 3/2020 | Patel | B60C 23/0461 |
| 2012/0007729 | A1* | 1/2012 | Patel | B60C 23/0471 |
| | | | | 340/442 |
| 2014/0277910 | A1* | 9/2014 | Suh | B60C 23/02 |
| | | | | 701/31.4 |
| 2015/0375578 | A1* | 12/2015 | Patel | B60C 23/0418 |
| | | | | 340/442 |

* cited by examiner

*Primary Examiner* — Hussein Elchanti
(74) *Attorney, Agent, or Firm* — Frank Lollo; Eversheds Sutherland (US) LLP (57) ABSTRACT

Method and apparatus are disclosed for controlling vehicle TPMS sensor localization. An example vehicle includes a plurality of tire pressure monitoring system (TPMS) sensors, a communication module, and a controller. The controller is to detect an initiation event associated with the vehicle, and, in response to detecting the initiation event, determine whether first localization information is valid based on information associated with the TPMS sensors. The controller is also to initiate, via the communication module, a localization procedure at the TPMS sensors when the first localization information is not valid.

18 Claims, 3 Drawing Sheets

SYSTEMS AND METHODS FOR CONTROLLING VEHICLE TPMS SENSOR LOCALIZATION

CROSS-REFERENCE TO RELATED APPLICATIONS

The present disclosure claims priority to, the benefit of, and is a divisional application of U.S. application Ser. No. 15/885,250, filed Jan. 31, 2018, which is hereby incorporated by reference herein in its entirety.

TECHNICAL FIELD

The present disclosure generally relates to tire pressure and, more specifically, to systems and methods for controlling vehicle TPMS sensor localization.

BACKGROUND

Typically, vehicles include tires that are coupled to respective wheel rims. Generally, the tires are formed of rubber (e.g., synthetic rubber, natural rubber), fabric, wiring, and/or other materials and chemical compounds that reduce wear-and-tear of the wheels, improve handling, and/or affect other vehicle characteristics (e.g., fuel economy) during operation of a vehicle. Recently, vehicles have implemented tire pressure monitoring systems (TPMS) that monitor tire pressures and/or other characteristics of the tires. For instance, a vehicle may include a TPMS sensor for each tire of the vehicle.

The TPMS sensors measure the pressure of the corresponding vehicle tire, and may transmit the measured pressure to the vehicle for display to a driver. The TPMS sensors are located on the interior of the tire rim, and may transmit information at a slow rate to conserve battery life. Each TPMS sensor may provide information about the tire pressure which can be used to determine the corresponding location of the tire. When tires are rotated or changed entirely, the TPMS sensors may no longer correspond to their previous positions on the vehicle.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for controlling vehicle TPMS sensor localization. An example disclosed vehicle includes a plurality of tire pressure monitoring system (TPMS) sensors, a communication module, and a controller. The controller is to detect an initiation event associated with the vehicle, and, in response to detecting the initiation event, determine whether first localization information is valid based on information associated with the TPMS sensors. The controller is also to initiate, via the communication module, a localization procedure at the TPMS sensors when the first localization information is not valid.

An example disclosed method includes detecting, via a processor, an initiation event associated with a vehicle. The method also includes, in response to detecting the initiation event, determining whether first localization information is valid based on information associated with a plurality of tire pressure monitoring system (TPMS) sensors of the vehicle. The method also includes initiating, via the processor, a localization procedure at the TPMS sensors when the first localization information is not valid.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Typically, vehicles include tires that are coupled to respective wheel rims. Generally, the tires are formed of rubber (e.g., synthetic rubber, natural rubber), fabric, wiring, and/or other materials and chemical compounds that reduce wear-and-tear of the wheels, improve handling, and/or affect other vehicle characteristics (e.g., fuel economy) during operation of a vehicle. Recently, vehicles have implemented a tire pressure monitoring system (TPMS) that monitors tire pressures and/or other characteristics of the tires. For instance, a vehicle may include a TPMS sensor for each tire of the vehicle. In such instances, if one of the TPMS sensors detects a low tire pressure, a cluster output device of the vehicle is activated to alert an operator (e.g., a driver) of the vehicle to the low tire pressure. Oftentimes, TPMS sensors are configured to collect tire pressure measurements once every minute (or every few minutes).

Examples disclosed herein include a TPMS controller that detects an initiation event of a vehicle. For example, initiation events detected by the TPMS controller include the vehicle transitioning from stop (e.g., a stopping state) to drive (e.g., a driving state), the vehicle satisfying a threshold speed (e.g., the vehicle is travelling at more than 8 kilometers per hour), or the vehicle determining that pressure value received from a sensor is below the "low pressure" threshold.

Upon detecting the initiation event, the TPMS controller determines whether previously collected localization information is valid. For example, the TPMS controller may use timestamps, location information (e.g., GPS position/location information), sensor identifiers, etc. associated with the previously collected localization information to determine whether the previously collected localization information is valid.

If the TPMS controller determines that the previously collected localization information is valid, then the TPMS controller skips (e.g., foregoes) the localization procedure at the current time to conserve battery life.

If the TPMS controller determines that the previously collected localization information is not valid, then the TPMS controller initiates a localization procedure to collect updated localization information. For example, the TPMS controller activates TPMS sensors of a vehicle in a bi-directional paired state upon detecting an initiation event of the vehicle. To activate the TPMS sensors in the bi-directional state, the TPMS controller emits a low-frequency pairing request for the TPMS sensors, establishes communication with the TPMS sensors via a Bluetooth® low-energy and/or other communication protocol, and sends an instruction to the TPMS sensors via the established communication pairings to collect tire pressure data. Additionally or alternatively, the TPMS controller may send a pairing request via a wireless communication protocol, such as Bluetooth® low-energy or Wi-Fi, and the TPMS sensors may be configured to open a receive buffer on a periodic interrupt to pair with the vehicle (e.g., the TPMS controller) upon receiving the pairing request.

Figure 1:
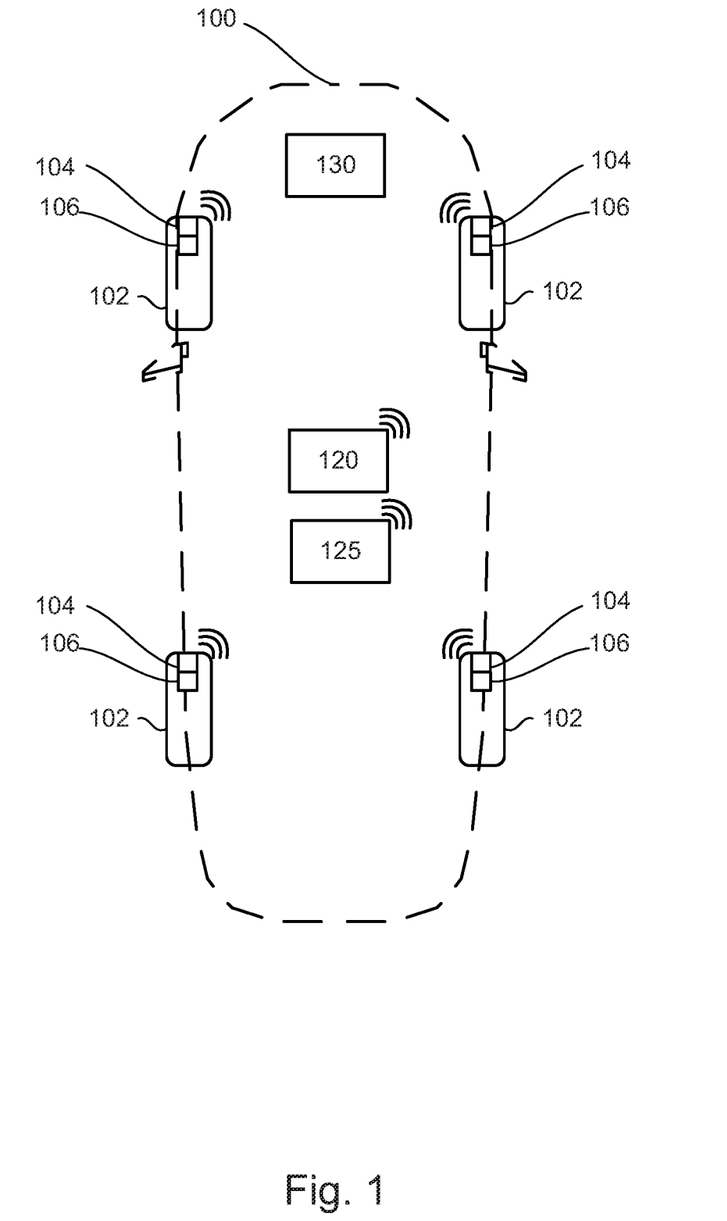
FIG. 1 illustrates an example vehicle according to embodiments of the present disclosure.

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input).

The vehicle 100 of the illustrated example includes an engine. For example, the engine includes an internal combustion engine, an electric motor, a hybrid engine and/or any other power source that propels movement of the vehicle 100.

As illustrated in FIG. 1, the vehicle 100 includes tires 102 and tire pressure monitoring system (TPMS) sensors 104. For example, the tires 102 are coupled to respective wheel rims of the vehicle 100. In some examples, the tires 102 are formed of rubber (e.g., synthetic rubber, natural rubber), fabric, wiring, and/or other materials and chemical compounds that reduce wear-and-tear of the wheels, improve handling, and/or affect other vehicle characteristics (e.g., fuel economy) during operation of the vehicle 100. Further, in some examples, the tires 102 include treads (e.g., grooved patterns) on their outer surfaces to further improve handling during operation of the vehicle 100.

The TPMS sensors 104 of the illustrated example include circuitry configured to determine tire pressures and/or other characteristics of the tires 102. For example, each of the TPMS sensors 104 include one or more processors and/or memory that may enable the TPMS sensors 104 to carry out one or more functions. Each of the TPMS sensors 104 also include a pressure sensor to detect a tire pressure of the corresponding one of the tires 102. Further, each of the TPMS sensors 104 includes circuitry to facilitate communication with one or more devices or systems, such as a communication module 120 of vehicle 100. For example, each of the TPMS sensors 104 include antenna(s) that are configured to (i) receive and transmit data collected from a pressure sensor and/or other sensor(s) of the TPMS sensor 104 and (ii) receive signals/request (e.g., activation signals/requests, wake-up signals/requests, pairing signals/requests, instructions, etc.) from the communication module 120 of the vehicle 100. The antenna(s) and/or communication module of each of the TPMS sensors 104 enable communication with the communication module 120 of the vehicle 100 via low-frequency signals, high-frequency signals, ultra high frequency (e.g., 315 MHz and/or 433 MHz) signals, Ultra-Wide Band (UWB) signals, Bluetooth® communication protocol, Bluetooth® Low Energy (BLE) protocol, Wi-Fi communication protocol (e.g., IEEE 802.11a/b/g/n/ac), etc.

The communication module 120 of the illustrated example includes wired or wireless network interfaces to enable communication with external networks. The communication module 120 also includes hardware (e.g., processors, memory, storage, antenna, etc.) and software to control the wired or wireless network interfaces. In the illustrated example, the communication module 120 includes one or more communication controllers for cellular networks (e.g., Global System for Mobile Communications (GSM), Universal Mobile Telecommunications System (UMTS), Long Term Evolution (LTE), Code Division Multiple Access (CDMA)), Near Field Communication (NFC) and/or other standards-based networks (e.g., WiMAX (IEEE 802.16m); Near Field Communication (NFC), local area wireless network (including IEEE 802.11a/b/g/n/ac or others), Wireless Gigabit (IEEE 802.11ad), etc.). In some examples, the communication module 120 includes a wired or wireless interface (e.g., an auxiliary port, a Universal Serial Bus (USB) port, a Bluetooth® wireless node, etc.) to communicatively couple with a mobile device (e.g., a smart phone, a wearable, a smart watch, a tablet, etc.). In some examples, the communication module 120 implements the Bluetooth® and/or BLE protocols. The Bluetooth® and BLE protocols are set forth in Volume 6 of the Bluetooth® Specification 4.0 (and subsequent revisions) maintained by the Bluetooth® Special Interest Group. In some examples, the vehicle 100 may communicate with the external network via, for example, a coupled mobile device. The external network(s) may be a public network, such as the Internet, a private network, such as an intranet, or combinations thereof, and may utilize a variety of networking protocols now available or later developed including, but not limited to, TCP/IP-based networking protocols.

In the illustrated example of FIG. 1, each of the TPMS sensors 104 include an LF receiver 106 to facilitate communication with an LF antenna 125 via low frequency transmissions. For example, the LF antenna 125 may transmit a wake-up request via a low frequency (LF) transmission that is received by the LF receivers 106. The LF receivers 106 may then cause the TPMS sensors 104 to transition from a sleep mode to an active mode.

Further, the vehicle 100 includes a TPMS controller 130. For example, the TPMS controller 130 is configured to activate, localize, collect measurements from, and present alert(s) based on the TPMS sensors 104 of the respective tires 102. That is, the TPMS controller 130 collects tire pressure measurements from the TPMS sensors 104 of the vehicle 100, compares the collected tire pressure measurements to a tire pressure threshold, and presents a low-pressure alert to a user (e.g., a driver) when one or more of the tire pressure measurements is less than the tire pressure threshold. The tire pressure threshold may correspond to a factory-recommended lower limit of a tire pressure for the tires 102 and/or the vehicle 100.

In the illustrated example, the TPMS sensors 104 are configured to be in a sleep mode (also referred to as a stationary mode) and an active mode (also referred to as a driving mode).

The TPMS sensors 104 are set in sleep mode upon determining that the vehicle 100 has been stationary for a predetermined period of time (e.g., 5 minutes, 10 minutes, etc.) and/or the vehicle 100 is travelling at less than a predetermined speed (e.g., 8 kilometers per hour, 16 kilometers miles per hour, etc). The vehicle 100 may be stationary for the predetermined period of time when the vehicle 100 is parked and/or when the vehicle 100 is stuck in traffic. For example, one or more of the TPMS sensors 104 of the vehicle 100 includes a sensor (e.g., a gyroscope, an accelerometer, etc.) to detect rotation of the corresponding one of the tires 102. That is, the sensors detect movement of the tires 102. When the sensors detect that the tires 102 are stationary, the TPMS sensors 104 determine that the vehicle 100 is stationary. If the TPMS sensors 104 determine that the vehicle 100 is stationary for the predetermined period of time, the TPMS controller 130 sets the TPMS sensors 104 in sleep mode. Further, when the TPMS sensors 104 are in the sleep mode, the pressure sensors of the TPMS sensors 104 collect tire pressure measurements at extended intervals (e.g., once every 6 hours) to reduce an amount of energy consumed by the TPMS sensors 104 over a period of time. In some examples, the TPMS sensors 104 periodically broadcast (e.g., once every 6 hours) a "heart beat" including pressure information and a sensor identifier.

The TPMS controller 130 sets the TPMS sensors 104 in active mode upon determining that the vehicle 100 is moving. For example, the TPMS sensors 104 determine that the vehicle 100 is moving when the sensors detect that the tires 102 are rotating. The TPMS sensors 104 are activated for monitoring the tires 102 upon transitioning to the active mode from the sleep mode. For example, to activate the TPMS sensors 104, communication is established between the TPMS sensors 102 and the communication module 120 of the vehicle 100 to pair the TPMS sensors 104 to the communication module 120 and/or other communication module(s) of the vehicle 100. For example, the TPMS controller 130 pairs the TPMS sensors 104 to the communication module 120 via BLE, Bluetooth®, Wi-Fi®, UWB, UHF, and/or any other communication protocol. Upon pairing the TPMS sensors 104, the TPMS controller 130 sends an instruction, via the communication module 120, to the TPMS sensors 104 to instruct the TPMS sensors 104 to collect tire pressure measurements from the tires 102.

Further, the TPMS controller 130 localizes the tires 102 based on the communication between the TPMS sensors 104 and the communication module 120. That is, the TPMS controller 130 identifies the location of each of the TPMS sensors 104 and the corresponding tires 102 based on the communication between the TPMS sensors 102 and the communication module 120. For example, the TPMS controller 130 identifies which of the TPMS sensors 104 is located at a front driver-side wheel well, a front passenger-side wheel well, a rear driver-side wheel well, and a rear passenger-side wheel well. In some examples, the TPMS controller 130 determines locations of the TPMS sensors 104 based upon received signal strength indicators (RSSIs), time-of-flight, and/or angle-of-arrival of signals sent between the TPMS sensors 104 and the communication module 120 and/or other communication module(s) located throughout the vehicle 100. For example, the TPMS controller 130 utilizes triangulation and/or trilateration to localize the TPMS sensors 104 based upon the RSSIs, time-of-flight, and/or angle-of-arrival of signals sent between the TPMS sensors 104 and the plurality of communication modules.

When the TPMS sensors 104 are in active mode, the pressure sensors of the TPMS sensors 104 collect tire pressure measurements at short intervals (e.g., once every minute) to enable the TPMS sensors 104 to quickly detect a drop in air pressure of the tires 102 while the vehicle 100 is moving. For example, by collecting tire pressure measurements at short intervals, the TPMS sensors 104 are able to detect a puncture to one of the tires 102 while the vehicle 100 is traveling along a road. Upon collecting the tire pressure measurements, the TPMS sensors 104 send the tire pressure measurements to the TPMS controller 130 via the communication module 120 of the vehicle 100. For example, the communication module 120 communicates with the TPMS sensors 104 via BLE communication, Bluetooth® communication, Wi-Fi® Communication, UWB communication, UHF communication, and/or any other communication protocol to collect the tire pressure measurements from the TPMS sensors 104. Further, the TPMS controller 130 compares the tire pressure measurements to a tire pressure threshold corresponding to the tires 102 and/or the vehicle 100. In response to determining that one or more of the tire pressure measurements is less than the tire pressure threshold, the TPMS controller 130 presents a low-pressure alert to the user (e.g., via a display 218 of an infotainment head unit 204 of FIG. 2).

In the illustrated example, to activate the TPMS sensors 104 into the paired state (e.g., a bi-directional paired state), the TPMS controller 130 sends, via the communication module 120, a low-energy pairing request to the TPMS sensors 104 upon detecting an initiation event. For example, the TPMS controller 130 may determine that the vehicle 100 is moving (e.g., based on movement of the tires 102). Additionally or alternatively, the TPMS controller 130 may detect the initiation event in response to determining that the vehicle 100 is travelling at least a predetermined speed (e.g., more than 8 kilometers per hour, etc.). Additionally or alternatively, the TPMS controller 130 may detect an initiation event in response to receive a pressure value from a TPMS sensor 104 that is below the "low pressure" threshold.

In response to determining that previously collected localization information is not valid, the TPMS controller 130 establishes a communication between the TPMS sensors 104 and the communication module 120 by initiating a pairing request. For example, communication is established between the TPMS sensors 104 and the communication module 120 of the vehicle 100 to pair the TPMS sensors 104 to the communication module 120 and/or other communication module(s) of the vehicle 100. In some examples, the TPMS controller 130 may initiate the pairing request by causing the LF antenna 125 to transmit a wake-up request to the TPMS sensors 104 (e.g., the LF receivers 106) via a low-frequency transmission. Additionally or alternatively, the TPMS sensors 104 may include a polling interval to detect pairing requests from the TPMS controller 130, the communication module 120, the LF antenna 125 and/or other communication module(s) of the vehicle 100. The TPMS controller 130 pairs the TPMS sensors 104 to establish BLE communication, Bluetooth® communication, Wi-Fi® communication, UWB communication, ultra-high frequency (UHF) communication and/or any other form of communication between the TPMS sensors 104 and the communication module 120.

Upon pairing the TPMS sensors 104 for communication with the communication module 120, the TPMS controller 130 determines whether stored localization information is valid. In the illustrated example, the stored localization information is localization information that was previously collected from the TPMS sensors 104 (e.g., during a previous paired state). The TPMS controller 130 stores the previously collected localization information in a database, such as example database 216 of on-board computing platform 202 of FIG. 2). The stored localization information includes location information of the TPMS sensors 104 (e.g., front driver-side wheel well, front passenger-side wheel well, rear driver-side wheel well, and rear passenger-side wheel well), whether the previous localization procedure was successful (e.g., whether all or a subset of the TPMS sensors 104 were localized), identifiers (e.g., Bluetooth® identifiers) associated with the TPMS sensors 104, and a timestamp (e.g., a date and/or time) when the localization information was collected. However, it should be appreciated that additional or alternative information may also be collected in the stored localization information.

The TPMS controller 130 may determine whether the stored localization information is valid based on different criteria. For example, the TPMS controller 130 may determine whether the stored localization information is stale based on a comparison of a timestamp associated with the stored localization information and a current timestamp. If a difference between the timestamp associated with the stored localization information and the current timestamp is greater than a predetermined period (e.g., does not satisfy a time threshold) (e.g., is more than 24 hours old), the TPMS controller 130 determines that the stored localization information is not valid.

In additional or alternate examples, the TPMS controller 130 may determine whether the stored localization information is valid by comparing current location information of the vehicle 100 to GPS information included with the stored localization information. For example, the TPMS controller 130 may determine that the stored localization information is not valid based on determining a relatively significant change (e.g., does not satisfy a location threshold) in GPS location of the vehicle 100 between the current location of the vehicle 100 and location information associated with the stored localization information (e.g., in response to the vehicle 100 being moved (e.g., towed) without initiating the engine, etc.).

In additional or alternate examples, the TPMS controller 130 may determine whether the stored localization information is valid by comparing sensor identifiers associated with the TPMS sensors 104 with identifiers included (e.g., sensor identifiers) in the stored localization information. For example, when a TPMS sensor 104 enters into a paired state, the TPMS sensor 104 may provide (e.g., broadcast) their sensor identifier (e.g., a Bluetooth® identifier, an alphanumeric string, etc.) to the TPMS controller 130. Additionally or alternatively, the TPMS sensors 104 may periodically broadcast (e.g., every 6 hours) a heart beat that includes a pressure value and a sensor identifier. The TPMS controller 130 may then compare the identifiers associated with the TPMS sensors 104 that are currently paired with the TPMS controller 130 and the identifiers included in the stored localization information to determine whether the stored localization information is valid. For example, if one or more of the tires 102 of the vehicle 100 were replaced, the set of sensor identifiers included in the stored localization information would not match the set of sensor identifiers currently broadcast by the TPMS sensors 104, and the TPMS controller 130 would determine that the stored localization information is not valid. In additional or alternate examples, the TPMS controller 130 may determine that at least one the TPMS sensors 104 that is currently broadcasting has a significant drop in RSSI (e.g., a tire has been moved to the trunk of the vehicle 100) and the TPMS controller 130 would determine that the stored localization information is not valid.

In additional or alternate examples, the TPMS controller 130 may determine whether the stored localization information is valid by checking if the stored localization information includes any indicators of incomplete localization. For example, one or more of the TPMS sensors 104 may have been unable to localize during the previous localization procedure and, thus, the stored localization information may include a flag associated with an incomplete localization from one or more of the TPMS sensors 104.

In the illustrated example, if the TPMS controller 130 determines that the stored localization information is valid, the TPMS controller 130 skips initiating a localization procedure and may set all of the TPMS sensors 104 to sleep mode. By skipping (or foregoing) the localization procedure, the TPMS controller 130 conserves battery life of the TPMS sensors 104 by reducing the time they spend paired with the TPMS controller 130 and/or the communication module 120. The TPMS controller 130 may then wait for another initiation event to determine whether to perform a localization procedure.

The TPMS controller 130 also localizes the tires 102 based on the communication between the TPMS sensors 104 and the communication module 120. For example, the TPMS controller 130 determines locations of the TPMS sensors 104 based upon RSSIs, time-of-flight, and/or angle-of-arrival of signals sent between the TPMS sensors 104 and the communication module 120 and/or other communication module(s) located throughout the vehicle 100. For example, the TPMS controller 130 utilizes triangulation and/or trilateration to localize the TPMS sensors 104 based upon received signal strength indicators (RSSIs), time-of-flight, and/or angle-of-arrival of signals sent between the TPMS sensors 104 and the plurality of communication modules.

In the illustrated example, when the TPMS controller 130 localizes a tire 102, the TPMS controller 130 may set the corresponding TPMS sensor 104 to sleep mode to conserve battery life of the corresponding TPMS sensor 104. In some examples, the TPMS controller 130 may re-initiate the localization procedure for one or more of the TPMS sensors 104 if the TPMS controller 130 receives an incomplete localization flag from a TPMS sensor 104. For example, the localization procedure may time-out after a time-out period has passed (e.g., after ten minutes of trying to localize the tires 102 once the TPMS controller 130 initiates the localization procedure, etc.). By re-initiating the localization procedure for the one or more of the TPMS sensors 104, the TPMS controller 130 enables the TPMS sensors 104 to continue to attempt to localize and provide localization information to the TPMS controller 130. The TPMS controller 130 may re-initiate the localization procedure for all of the TPMS sensors 104, a subset of the TPMS sensors (e.g., the TPMS sensors 104 that provided incomplete localization flags), or none of the TPMS sensors 104.

When the TPMS sensors 104 are providing localization information to the TPMS controller 130, the pressure sensors of the TPMS sensors 104 collect tire pressure measurements of the tires 102. Upon collecting the tire pressure measurements, the TPMS sensors 104 send the tire pressure measurements to the TPMS controller 130 via the communication module 120 of the vehicle 100. That is, the TPMS controller 130 collects the tire pressure measurements from the TPMS sensors 104 via the communication module 120. For example, the communication module 120 receives the tire pressure measurements from the TPMS sensors 104 via BLE communication, Bluetooth® communication, Wi-Fi® Communication, UWB communication, UHF communication, and/or any other communication protocol to collect the tire pressure measurements from the TPMS sensors 104.

Further, the TPMS controller 130 of the illustrated example compares the tire pressure measurements to a tire pressure threshold corresponding to the tires 102 and/or the vehicle 100. The TPMS controller 130 is configured to present a low-pressure alert to the user (e.g., via a display 218 of an infotainment head unit 204 of FIG. 2) in response to determining that one or more of the tire pressure measurements is less than the tire pressure threshold. In some examples, the TPMS controller 130 is configured to present a low-pressure alert and/or tire pressure measurement(s) via a display (e.g., a display 218 of FIG. 2), speakers (e.g., speakers 220 of FIG. 2), and/or any other output device of the vehicle 100 upon identifying a low tire pressure for one of the tires 102. Further, in some examples, the TPMS controller 130 stores (e.g., via memory 214 of FIG. 2) the tire pressure measurement(s) and/or low-pressure alert until the user has entered the vehicle 100 and/or the engine of the vehicle 100 is activated. In such examples, the TPMS controller 130 presents the tire pressure measurement(s) and/or low-pressure alert via the output device(s) of the vehicle 100 upon detecting that the user is within the vehicle 100 and/or the engine has started. Additionally or alternatively, the TPMS controller 130 sends a signal to a mobile device of the user, for example, via the communication module 120, to present the tire pressure measurement(s) and/or low-pressure alert to the user via their mobile device. For example, TPMS controller 130 instructs the mobile device to present tire pressure measurement(s) and/or low-pressure alert to enable the user to determine whether one or more of the tires 102 has a low pressure before entering and operating the vehicle 100.

Figure 2:
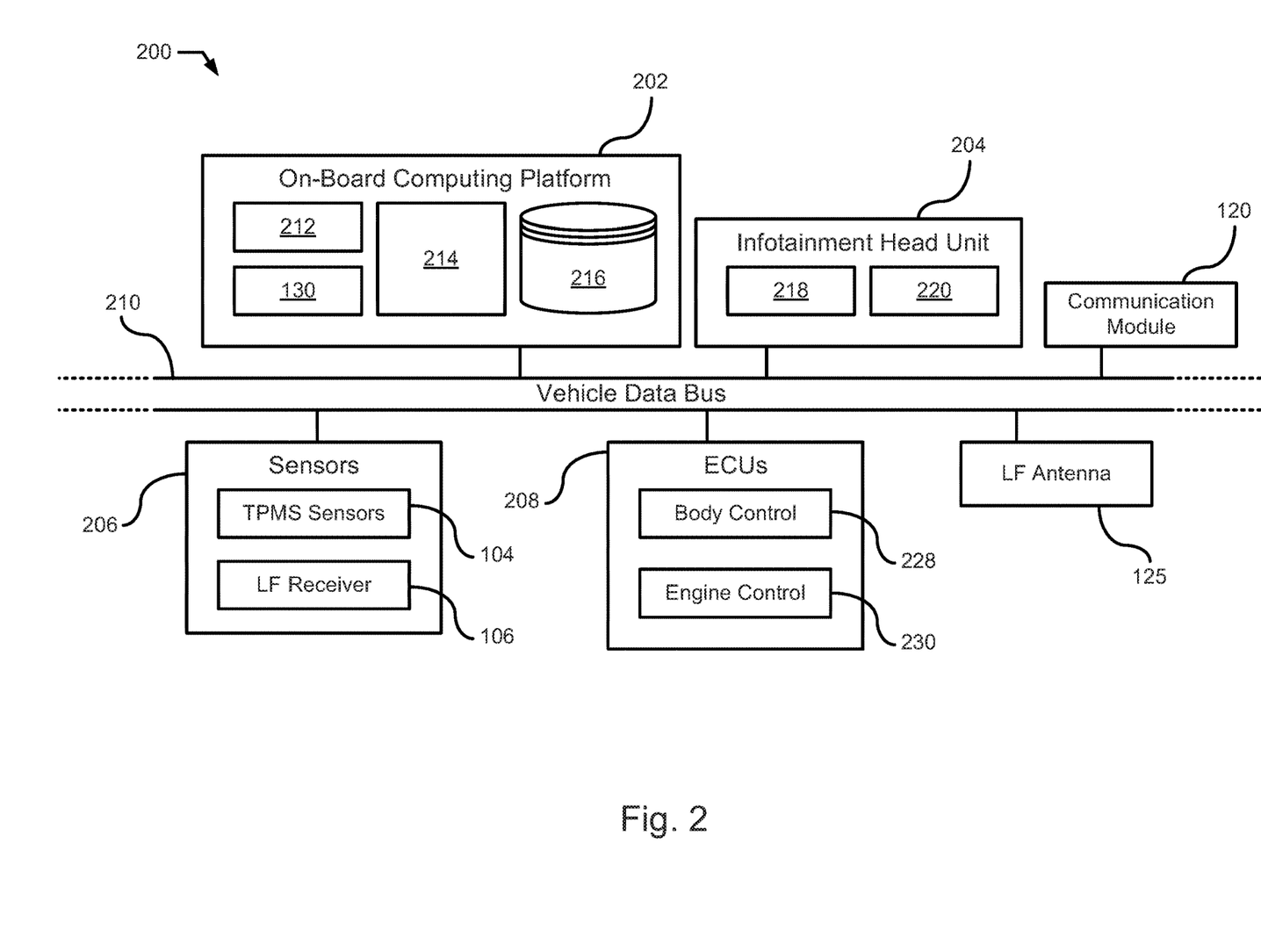
FIG. 2 illustrates an example block diagram of electronic components of the vehicle of FIG. 1.

FIG. 2 is a block diagram of electronic components 200 of the vehicle 100. As illustrated in FIG. 2, the electronic components 200 include an on-board computing platform 202, an infotainment head unit 204, the communication module 120, the LF antenna 125, sensors 206, electronic control units (ECUs) 208, and a vehicle data bus 210.

The on-board computing platform 202 includes a microcontroller unit, controller or processor 212, memory 214, and a database 216. In some examples, the processor 212 of the on-board computing platform 202 is structured to include the TPMS controller 130. Alternatively, in some examples, the TPMS controller 130 is incorporated into another electronic control unit (ECU) with its own processor 212, memory 214, and/or database 216. The database 216 stores, for example, entries that correspond to previously collected localization information. For example, the TPMS controller 130 may record in the database 216 information such as the stored localization information. The stored localization information includes location information of the TPMS sensors 104 (e.g., front driver-side wheel well, front passenger-side wheel well, rear driver-side wheel well, and rear passenger-side wheel well), whether the previous localization procedure was successful (e.g., whether all or a subset of the TPMS sensors 104 were localized), identifiers (e.g., Bluetooth® identifiers) associated with the TPMS sensors 104, and a timestamp (e.g., a date and/or time) when the localization information was collected. However, it should be appreciated that the TPMS controller 130 may record additional or alternative information in the stored localization information. The TPMS controller 130 may process the stored localization information to determine whether the stored localization information is valid.

The processor 212 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 214 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 214 includes multiple kinds of memory, particularly volatile memory and non-volatile memory.

The memory 214 is computer readable media on which one or more sets of instructions, such as software for operating the methods of the present disclosure, can be embedded. The instructions may embody one or more of the methods or logic as described herein. For example, the instructions reside completely, or at least partially, within any one or more of the memory 214, the computer readable medium, and/or within the processor 212 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 204 provides an interface between the vehicle 100 and the user. The infotainment head unit 204 includes digital and/or analog interfaces (e.g., input devices and output devices) to receive input from and display information for the user(s). The input devices include, for example, a control knob, an instrument panel, a digital camera for image capture and/or visual command recognition, a touch screen, an audio input device (e.g., cabin microphone), buttons, or a touchpad. The output devices may include actuators, a display 218 (e.g., a cluster output, a heads-up display, a center console display such as a liquid crystal display (LCD), an organic light emitting diode (OLED) display, a flat panel display, a solid state display, etc.), and/or speakers 220. For example, the infotainment head unit 204 includes hardware (e.g., a processor or controller, memory, storage, etc.) and software (e.g., an operating system, etc.) for an infotainment system (such as SYNC® and MyFord Touch® by Ford®). Additionally, the infotainment head unit 204 displays the infotainment system on, for example, a center console display. In the illustrated example, the TPMS controller 130 is configured to present low-pressure alert(s) to the user via the display 218, the speakers 220, and/or any other output device of the infotainment head unit 204.

The sensors 206 are arranged in and around the vehicle 100 to monitor properties of the vehicle 100 and/or an environment in which the vehicle 100 is located. One or more of the sensors 206 may be mounted to measure properties around an exterior of the vehicle 100. Additionally or alternatively, one or more of the sensors 206 may be mounted inside a cabin of the vehicle 100 or in a body of the vehicle 100 (e.g., an engine compartment, wheel wells, etc.) to measure properties in an interior of the vehicle 100. For example, the sensors 206 include accelerometers, odometers, tachometers, pitch and yaw sensors, wheel speed sensors, microphones, tire pressure sensors, biometric sensors, cameras, and/or sensors of any other suitable type. In the illustrated example, the sensors 206 include the TPMS sensors 104 and the LF receivers 106.

The ECUs 208 monitor and control the subsystems of the vehicle 100. For example, the ECUs 208 are discrete sets of electronics that include their own circuit(s) (e.g., integrated circuits, microprocessors, memory, storage, etc.) and firmware, sensors, actuators, and/or mounting hardware. The ECUs 208 communicate and exchange information via a vehicle data bus (e.g., the vehicle data bus 210). Additionally, the ECUs 208 may communicate properties (e.g., status of the ECUs 208, sensor readings, control state, error and diagnostic codes, etc.) to and/or receive requests from each other. For example, the vehicle 100 may have seventy or more of the ECUs 208 that are positioned in various locations around the vehicle 100 and are communicatively coupled by the vehicle data bus 210.

In the illustrated example, the ECUs 208 include a body control module 228 and an engine control unit 230. For example, the body control module 228 controls one or more subsystems throughout the vehicle 100, such as power windows, power locks, an immobilizer system, power mirrors, etc. For example, the body control module 228 includes circuits that drive one or more of relays (e.g., to control wiper fluid, etc.), brushed direct current (DC) motors (e.g., to control power seats, power locks, power windows, wipers, etc.), stepper motors, LEDs, etc. Further, the engine control unit 230 control(s) operation (e.g., remote starting, passive starting, and/or ignition switch starting) of the engine of the vehicle 100.

The vehicle data bus 210 communicatively couples the communication module 120, the LF antenna 125, the on-board computing platform 202, the infotainment head unit 204, the sensors 206, and the ECUs 208. In some examples, the vehicle data bus 210 includes one or more data buses. The vehicle data bus 210 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 3:
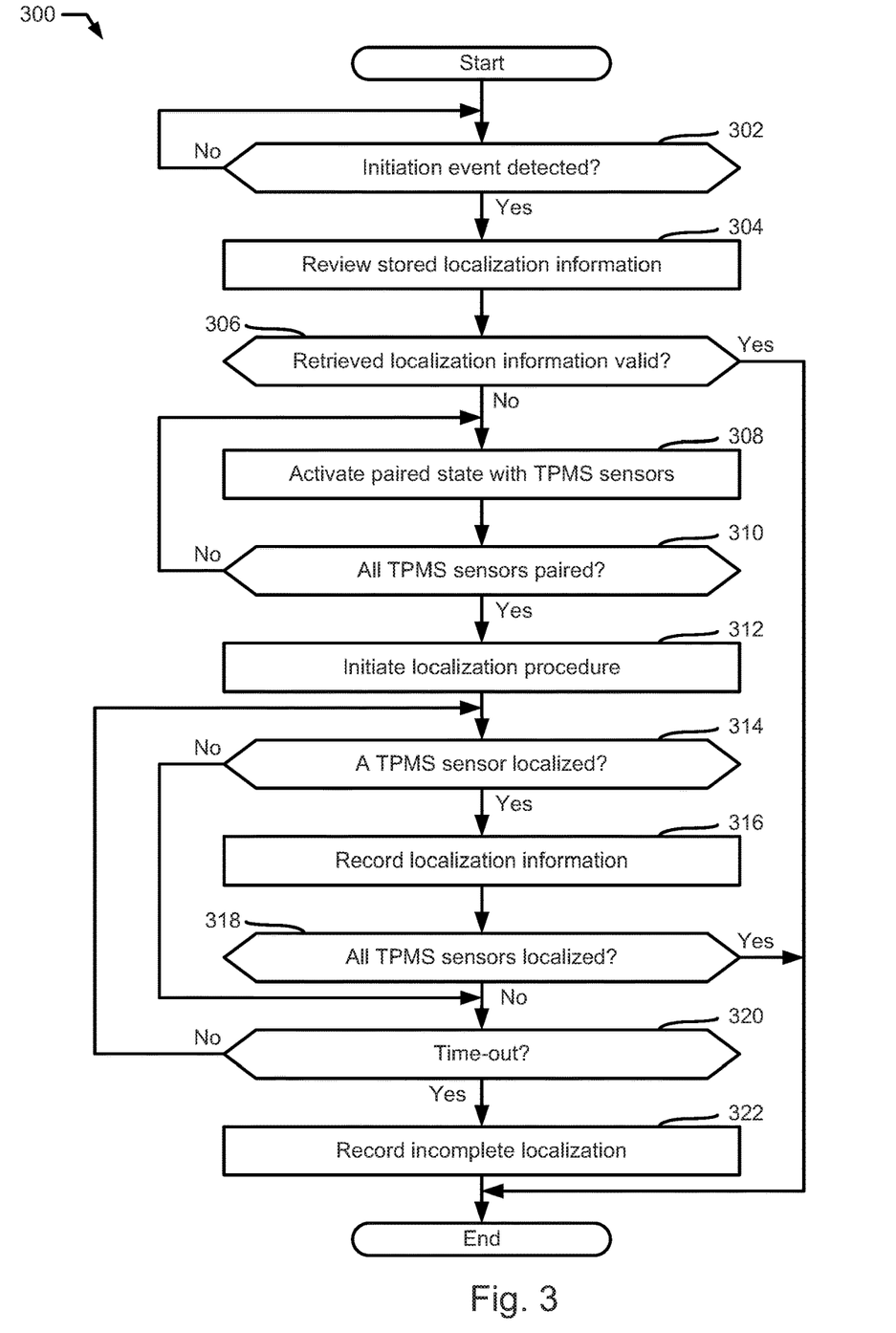
FIG. 3 illustrates a flowchart of an example method according to embodiments of the present disclosure.

FIG. 3 is a flowchart of an example method 300 for controlling vehicle TPMS sensor localization. The flowchart of FIG. 3 is representative of machine readable instructions that are stored in memory (such as the memory 214 of FIG. 2) and include one or more programs which, when executed by a processor (such as the processor 212 of FIG. 2), cause the vehicle 100 to implement the example TPMS controller 130 of FIG. 1 and/or FIG. 2. While the example program is described with reference to the flowchart illustrated in FIG. 3, many other methods of implementing the example TPMS controller 130 may alternatively be used. For example, the order of execution of the blocks may be rearranged, changed, eliminated, and/or combined to perform the method 300. Further, because the method 300 is disclosed in connection with the components of FIG. 1 and/or FIG. 2, some functions of those components will not be described in detail below.

Initially, at block 302, the TPMS controller 130 determines whether an initiation event has occurred. For example, the TPMS controller 130 may determine whether the vehicle 100 is moving and/or whether the vehicle 100 is travelling a threshold speed (e.g., more than 8 kilometers per hour, etc.). If, at block 302, the TPMS controller 130 does not detect an initiation event, the method 300 returns to block 302 to wait to detect an initiation event.

If, at block 302, the TPMS controller 130 detects an initiation event, then, at block 304, the TPMS controller 130 reviews stored localization information to determine whether the stored localization information is valid or whether to request updated localization information. For example, the TPMS controller 130 may retrieve stored localization information from the database 216 and process timestamps associated with the retrieved localization information, process location information associated with the retrieved localization information, process a set of sensor identifiers associated with the retrieved localization information, process flag(s) associated with the retrieved localization information, etc.

At block 306, the TPMS controller 130 determines whether the retrieved localization information is valid. In some examples, the TPMS controller 130 determines whether the retrieved localization information is valid based on a comparison of timestamps. Additionally or alternatively, the TPMS controller 130 may determine whether the retrieved localization information is valid based on a comparison of location information (e.g., GPS position/location information). Additionally or alternatively, the TPMS controller 130 may determine whether the retrieved localization information is valid based on a comparison of sensor identifiers. Additionally or alternatively, the TPMS controller 130 may determine whether the retrieved localization information is valid based on determining whether the retrieved localization information includes an incomplete localization flag. If, at block 306, the TPMS controller 130 determines that the retrieved localization information is valid, the example method 300 of FIG. 3 ends.

If, at block 306, the TPMS controller 130 determines that the retrieved localization information is not valid (e.g., is stale), then, at block 308, the TPMS controller 130 activates (e.g., initiates) a paired state with the TPMS sensors 104 of the vehicle 100. At block 310, the TPMS controller 130 determines whether all of the TPMS sensors 104 are in the paired state. If, at block 310, the TPMS controller 130 determines that one or more of the TPMS sensors 104 are not in the paired state, the method 300 returns to block 308 to activate the paired state with the one or more TPMS sensors 104.

If, at block 310, the TPMS controller 130 determines that all of the TPMS sensors 104 are in the paired state, then, at block 312, the TPMS controller 130 initiates a localization procedure.

At block 314, the TPMS controller 130 determines whether a TPMS sensor 104 localized. If, at block 314, the TPMS controller 130 did not receive an indication that a TPMS sensor 104 localized, then the method 300 proceeds to block 320 to determine whether a time-out occurred. If, at block 314, the TPMS controller 130 determines that a TPMS sensor 104 was localized, then, at block 316, the TPMS controller 130 records the localization information provided by the TPMS sensor 104. For example, the TPMS controller 130 may record a sensor identifier associated with the TPMS sensor 104, location information of the TPMS sensor 104, location information of the vehicle 100, a timestamp, etc.

At block 318, the TPMS controller 130 determines whether all of the TPMS sensors 104 are localized. If, at block 318, the TPMS controller 130 determines that all of the TPMS sensors 104 are localized, then the method 300 ends.

If, at block 318, the TPMS controller 130 determines that at least one TPMS sensor 104 is not localized, then, at block 320, the TPMS controller 130 determines whether a time-out occurred. For example, a time-out may occur if the time elapsed since the TPMS controller 130 initiated the localization procedure exceeds a time-out threshold (e.g., more than 10 minutes).

If, at block 320, the TPMS controller 130 determines that a time-out did not occur, then the method 300 returns to block 314 to wait for a TPMS sensor 104 to localize If, at block 320, the TPMS controller 130 determines that a time-out occurred, then, at block 322, the TPMS controller 130 records a flag associated with an incomplete localization with the current localization information. The method 300 then ends.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the terms "module," "unit," and "node" refer to hardware with circuitry to provide communication, control and/or monitoring capabilities, often in conjunction with sensors. A "module," a "unit," and a "node" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a plurality of tire pressure monitoring system (TPMS) sensors;
   a communication module; and
   a controller to:
      detect an initiation event associated with the vehicle;
      responsive to detection of the initiation event, determine whether first localization information is valid based on information associated with the TPMS sensors, wherein the controller is to determine whether the first localization information is valid by:
         comparing first location information associated with the first localization information and current location information associated with the vehicle; and
         determining that the first localization information is not valid when a difference between the first location information and the current location information does not satisfy a location threshold; and
      initiate, via the communication module, a localization procedure at the TPMS sensors when the first localization information is not valid.

2. The vehicle of claim 1, wherein the controller is to detect the initiation event in response to a determination that the vehicle is moving.

3. The vehicle of claim 1, wherein the controller is to detect the initiation event in response to a determination that a vehicle speed satisfies a threshold speed.

4. The vehicle of claim 1, wherein the controller is to initiate the localization procedure at the TPMS sensors by initiating, via the communication module, a paired state with the TPMS sensors.

5. The vehicle of claim 4, wherein the paired state is a wireless communication protocol paired state.

6. The vehicle of claim 1, wherein the first localization information was collected at a time prior to the controller detecting the initiation event.

7. The vehicle of claim 1, wherein the controller is to determine whether the first localization information is valid by:
   comparing a first timestamp associated with the first localization information and a current timestamp; and
   determining that the first localization information is not valid when a difference between the first timestamp and the current timestamp does not satisfy a time threshold.

8. The vehicle of claim 1, wherein the controller is to determine whether the first localization information is valid by:
   comparing respective sensor identifiers associated with each of the TPMS sensors to sensor identifiers associated with the first localization information; and
   determining that the first localization information is not valid when at least one of the respective sensor identifiers associated with the TPMS sensors is not included in the sensor identifiers associated with the first localization information.

9. The vehicle of claim 1, wherein the controller is to determine that the first localization information is not valid when the first localization information includes information associated with an incomplete localization.

10. The vehicle of claim 1, wherein the controller is to stop the localization procedure for a TPMS sensor when the respective TPMS sensor is localized.

11. The vehicle of claim 1, wherein the controller is to re-initiate the localization procedure with a TPMS sensor in response to receiving an incomplete localization flag from the TPMS sensor.

12. A method comprising:
   detecting, via a processor, an initiation event associated with a vehicle;
   in response to detecting the initiation event, determining whether first localization information is valid based on information associated with a plurality of tire pressure monitoring system (TPMS) sensors of the vehicle, wherein the determining of whether the first localization information is valid includes:
      comparing first location information associated with the first localization information and current location information associated with the vehicle; and
      determining that the first localization information is not valid when a difference between the first location information and the current location information does not satisfy a location threshold; and initiating, via the processor, a localization procedure at the TPMS sensors when the first localization information is not valid.

13. The method of claim 12, wherein the initiating of the localization procedure at the TPMS sensors includes initiating a paired state with the TPMS sensors.

14. The method of claim 13, wherein the paired state is a wireless communication protocol paired state.

15. The method of claim 12, wherein the first localization information was collected at a time prior to the detecting of the initiation event.

16. The method of claim 12, wherein the determining of whether the first localization information is valid includes:
    comparing a first timestamp associated with the first localization information and a current timestamp; and
    determining that the first localization information is not valid when a difference between the first timestamp and the current timestamp does not satisfy a time threshold.

17. The method of claim 12, wherein the determining of whether the first localization information is valid includes:
    comparing respective sensor identifiers associated with each of the TPMS sensors to sensor identifiers associated with the first localization information; and
    determining that the first localization information is not valid when at least one of the respective sensor identifiers associated with the TPMS sensors is not included in the sensor identifiers associated with the first localization information.

18. The method of claim 12, wherein the determining of whether the first localization information is valid includes determining that the first localization information includes information associated with an incomplete localization.

* * * * *